United States Patent
Shin

(10) Patent No.: US 8,057,958 B2
(45) Date of Patent: *Nov. 15, 2011

(54) ELECTRODE FOR FUEL CELL, MEMBRANE-ELECTRODE ASSEMBLY COMPRISING SAME AND FUEL CELL SYSTEM COMPRISING SAME

(75) Inventor: Chan-Gyun Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/494,851

(22) Filed: Jul. 28, 2006

(65) Prior Publication Data

US 2007/0042262 A1 Feb. 22, 2007

(30) Foreign Application Priority Data

Jul. 29, 2005 (KR) ........................ 10-2005-0069525

(51) Int. Cl.
- *H01M 4/96* (2006.01)
- *H01M 4/92* (2006.01)
- *H01M 4/02* (2006.01)
- *H01M 4/36* (2006.01)
- *H01M 4/90* (2006.01)

(52) U.S. Cl. ........ 429/523; 429/524; 429/525; 429/526; 429/527; 429/483

(58) Field of Classification Search .................... 429/44, 429/42, 33, 30
See application file for complete search history.

(56) References Cited

U.S. PATENT DOCUMENTS

| | | | |
|---|---|---|---|
| 4,293,396 A | 10/1981 | Allen et al. | |
| 5,879,827 A | 3/1999 | Debe et al. | |
| 5,910,378 A * | 6/1999 | Debe et al. | ..................... 429/42 |
| 6,368,476 B1 | 4/2002 | DeMarinis et al. | |
| 6,444,347 B1 | 9/2002 | Ouvry et al. | |
| 6,589,682 B1 | 7/2003 | Fleckner et al. | |
| 6,686,308 B2 | 2/2004 | Mao et al. | |
| 6,869,721 B2 | 3/2005 | Imazato | |
| 7,351,444 B2 | 4/2008 | Wang et al. | |
| 2002/0061433 A1 | 5/2002 | Kawamura et al. | |
| 2002/0127170 A1 | 9/2002 | Hong et al. | |
| 2002/0146615 A1 | 10/2002 | Yamaura | |
| 2002/0175073 A1 | 11/2002 | Nakamura et al. | |
| 2002/0177032 A1 | 11/2002 | Suenaga et al. | |

(Continued)

FOREIGN PATENT DOCUMENTS

CN 1278747 A 1/2001

(Continued)

OTHER PUBLICATIONS

Korean Patent Abstracts, Publication No. 1020040011181 A; Publication Date: Feb. 5, 2004; in the name of Choi et al.

(Continued)

*Primary Examiner* — Barbara Gilliam
*Assistant Examiner* — Angela Martin
(74) *Attorney, Agent, or Firm* — Christie, Parker & Hale, LLP

(57) ABSTRACT

An electrode for a fuel cell, and a membrane-electrode assembly and a fuel cell system including the same. The electrode for a fuel cell includes a supporter including a nano-carbon fiber, a nano-carbon grown from the nano-carbon fiber, and a catalyst disposed on the nano-carbon.

17 Claims, 4 Drawing Sheets

U.S. PATENT DOCUMENTS

| | | | |
|---|---|---|---|
| 2003/0086859 A1 | 5/2003 | Kawakami et al. | |
| 2004/0053111 A1 | 3/2004 | Matsumoto | |
| 2004/0076870 A1* | 4/2004 | Tanaka et al. | 429/40 |
| 2004/0076871 A1 | 4/2004 | Gascoyne et al. | |
| 2004/0191602 A1 | 9/2004 | Ishikawa et al. | |
| 2004/0197638 A1* | 10/2004 | McElrath et al. | 429/44 |
| 2004/0234841 A1 | 11/2004 | Yoshitake et al. | |
| 2005/0287418 A1* | 12/2005 | Noh et al. | 429/40 |
| 2006/0115711 A1* | 6/2006 | Kim et al. | 429/44 |
| 2006/0115712 A1* | 6/2006 | Kim et al. | 429/44 |
| 2006/0172179 A1* | 8/2006 | Gu et al. | 429/44 |
| 2007/0231673 A1* | 10/2007 | Noh | 429/44 |
| 2007/0231675 A1* | 10/2007 | Son | 429/44 |

FOREIGN PATENT DOCUMENTS

| | | |
|---|---|---|
| CN | 1303525 | 7/2001 |
| CN | 1498435 A | 5/2004 |
| CN | 1523698 A | 8/2004 |
| CN | 1630676 A | 6/2005 |
| EP | 1 336 998 A1 | 8/2003 |
| EP | 1 383 186 A1 | 1/2004 |
| EP | 1 662 597 A1 | 5/2006 |
| EP | 1 667 271 A1 | 6/2006 |
| JP | 08-017440 | 1/1996 |
| JP | 62-232860 | 10/1997 |
| JP | 2000-260435 | 9/2000 |
| JP | 2001-216973 | 8/2001 |
| JP | 2002-110181 | 4/2002 |
| JP | 2002-298861 | 10/2002 |
| JP | 2002-534773 | 10/2002 |
| JP | 2003-115302 | 4/2003 |
| JP | 2003-200052 | 7/2003 |
| JP | 2004-036038 | 2/2004 |
| JP | 2004-059428 | 2/2004 |
| JP | 2004-103592 | 4/2004 |
| JP | 2004-152489 | 5/2004 |
| JP | 2004-288489 | 10/2004 |
| JP | 2004-311276 | 11/2004 |
| JP | 2004-362875 | 12/2004 |
| JP | 2005-100748 | 4/2005 |
| JP | 2006-80083 | 3/2006 |
| JP | 2006-511927 | 4/2006 |
| KR | 1993-0020757 | 10/1993 |
| KR | 10-1995-0028209 | 10/1995 |
| KR | 2003-0038771 | 5/2003 |
| KR | 2003-0095694 | 12/2003 |
| KR | 10-2004-0011181 | 2/2004 |
| KR | 10-2004-0051287 | 6/2004 |
| KR | 10-2006-0015810 | 2/2006 |
| WO | WO 99/33132 | 7/1999 |
| WO | WO 01/80334 A2 | 10/2001 |
| WO | WO 02/17427 * | 2/2002 |
| WO | WO 02/17427 A1 | 2/2002 |
| WO | WO 02/27828 A1 | 4/2002 |
| WO | WO 02/27830 A1 | 4/2002 |
| WO | WO 02/41432 A1 | 5/2002 |
| WO | WO 02/073722 A1 | 9/2002 |
| WO | WO 02/075831 A1 | 9/2002 |
| WO | WO 03/083128 A2 | 10/2003 |
| WO | WO 2004/109837 * | 12/2004 |
| WO | WO 2004/109837 A2 | 12/2004 |
| WO | WO 2005/044723 A | 5/2005 |
| WO | WO 2005/044723 A2 * | 5/2005 |

OTHER PUBLICATIONS

Patent Abstracts of Japan, Publication No. 2006-080083; Publication Date: Mar. 23, 2006; in the name of Ro.

Tang, Hao et al., *Deposition and electrocatalytic properties of platinum on well-aligned carbon nanotube(CNT) arrays for methanol oxidation*; Materials Chemistry and Physics 92 (2005) pp. 548-553.

Rajesh, B., et al.; *Pt-WO₃ supported on carbon nanotubes as possible anodes for direct methanol fuel cells*; Fuel 81 (2002) pp. 2177-2190.

Che, Guangli et al.; *Metal-Nanocluster-Filled Carbon Nanotubes: Catalytic Properties and Possible Applications in Electrochemical Energy Storage and Production*; Langmuir 1999, vol. 15, pp. 750-758; XP-000964916.

Extended European Search Report for corresponding application EP 06118097.2-2119; dated Oct. 6, 2006.

Patent Abstracts of Japan, Publication No. 2004-152489, dated May 27, 2004, in the name of Yuichi Shimakawa et al.

Korean Patent Abstracts, Publication No. 1020060015810 A, dated Feb. 21, 2008, in the name of Eun Sook Lee et al.

European Search Report, dated Apr. 24, 2006, for Application No. 05111288.6, in the name of Samsung SDI Co., Ltd.

Korean Patent Abstracts, Publication No. 10-1993-0020757, dated Oct. 20, 1993, in the name of Tae-Hee Lee et.

Korean Patent Abstracts for Publication No. 1020030095694 A; Date of publication of application Dec. 24, 2003, in the name of U Yeong Jung, et al.

Korean Patent Abstracts for Publication No. 1020040051287 A; Date of publication of application Jun. 18, 2004, in the name of Hye Gyeong Kim.

Patent Abstracts of Japan, Publication No. 2004-103592, dated Apr. 3, 2004, in the name of Shuichi Suzuki et al.

U.S. Office action dated Oct. 20, 2008, for related U.S. Appl. No. 11/221,999, indicating relevance of listed U.S. Patent 5,910,378 in this IDS.

U.S. Office action dated Jan. 22, 2009, for related U.S. Appl. No. 11/126,483, indicating relevance of listed reference in this IDS.

Patent Abstracts of Japan, Publication No. 2004-036038, dated Feb. 5, 2004, in the name of Hiroshi Hosokawa et al.

U.S. Office action dated May 14, 2009, for related U.S. Appl. No. 11/289,134, noting listed U.S. reference in this IDS.

Japanese Office action dated Oct. 27, 2009, for Japanese application 2005-340578, noting listed references in this IDS.

Japanese Office action dated Oct. 27, 2009, for Japanese application 2005-183925, noting listed reference in this IDS, as well as WO02/073722 previously filed in an IDS dated Nov. 11, 2008.

U.S. Office action dated Nov. 10, 2009, for related U.S. Appl. No. 11/126,483, noting listed U.S. reference in this IDS.

U.S. Office action dated Nov. 25, 2009, for related U.S. Appl. No. 11/221,999, citing JP 2002-298861 previously filed in an IDS dated Sep. 15, 2009.

U.S. Office action dated Nov. 23, 2009, for related U.S. Appl. No. 11/289,134.

U.S. Office action dated Nov. 24, 2009, for related U.S. Appl. No. 11/288,887.

Patent Abstract of Japan, Publication No. 62-232860, dated Oct. 13, 1997, in the name of Choichi Furuya et al.

Japanese Office action dated Apr. 20, 2010, for corresponding Japanese Patent application 2006-208240, noting listed references in this IDS.

U.S. Office action dated Mar. 24, 2010, for related U.S. Appl. No. 11/289,134.

U.S. Office action dated Apr. 28, 2010, for related U.S. Appl. No. 11/126,483.

Office Action dated Jun. 21, 2010, for related U.S. Appl. No. 11/221,999, 10 pages.

Office Action dated Aug. 4, 2010, for related U.S. Appl. No. 11/126,483, 9 pages.

Office Action dated Sep. 1, 2010, for related U.S. Appl. No. 11/289,134, 9 pages.

Patent Abstracts of Japan and English machine translation for JP 2001-216973.

Japanese Patent Office Action dated Nov. 2, 2010, issued in Japanese application No. JP 2005-261157, listing the Foreign Patent Documents references cited in this IDS.

U.S. Office action dated Dec. 8, 2010 and issued in related U.S. Appl. No. 11/221,999, 9 pages.

U.S. Office action dated Jan. 19, 2011, for cross reference U.S. Appl. No. 11/126,483, 11 pages.

U.S. Office action dated Feb. 16, 2011, for cross reference U.S. Appl. No. 11/289,134, 10 pages.

\* cited by examiner

ELECTRODE FOR FUEL CELL, MEMBRANE-ELECTRODE ASSEMBLY COMPRISING SAME AND FUEL CELL SYSTEM COMPRISING SAME

CROSS-REFERENCE TO RELATED APPLICATION

This application claims priority to and the benefit of Korean Patent Application No. 10-2005-0069525, filed in the Korean Intellectual Property Office on Jul. 29, 2005, the entire content of which is incorporated herein by reference.

BACKGROUND OF THE INVENTION

1. Field of the Invention

The present invention relates to an electrode for a fuel cell, and a membrane-electrode assembly and a fuel cell system including the same. More particularly, the present invention relates to an electrode for a fuel cell having a high catalyst activity, and a membrane-electrode assembly and a fuel cell system including the same.

2. Description of the Related Art

A fuel cell is a power generation system for producing electrical energy through an electrochemical redox reaction of an oxidant and a fuel (e.g., hydrogen or a hydrocarbon-based material, such as methanol, ethanol, natural gas, etc.).

A fuel cell includes a stack composed of unit cells and produces various ranges of power output.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has a high energy density, but requires a fuel reforming processor for reforming methane or methanol, natural gas, and the like in order to produce a hydrogen-rich gas as the fuel gas.

By contrast, a direct oxidation fuel cell has a lower energy density than that of the polymer electrolyte fuel cell, but it does not need an additional fuel reforming processor. Therefore, it can be used as a portable power source for small and common electrical equipment.

In the above-mentioned fuel cell system, the stack that generates electricity substantially includes several unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to the anode and adsorbed on one or more catalysts, and the fuel is oxidized to produce protons and electrons. The electrons are transferred into the cathode via an out-circuit mechanism, and the protons are transferred into the cathode through the polymer electrolyte membrane. An oxidant is supplied to the cathode, and the oxidant, protons, and electrons are reacted on a catalyst at the cathode to produce electricity, along with water.

SUMMARY OF THE INVENTION

An aspect of the present invention provides an electrode for a fuel cell with high catalyst activity. Another aspect of the present invention provides a membrane-electrode assembly that includes the electrode. Yet another embodiment of the present invention provides a fuel cell system that includes the electrode.

According to a first embodiment of the present invention, an electrode for a fuel cell is provided that includes a supporter including a nano-carbon fiber, a nano-carbon grown from the nano-carbon fiber, and a catalyst disposed on the nano-carbon.

According to a second embodiment of the present invention, a membrane-electrode assembly for a fuel cell is provided that includes an anode and a cathode, and a polymer electrolyte membrane disposed therebetween. At least one of the anode or the cathode is the above described electrode of the first embodiment.

According to a third embodiment of the present invention, a fuel cell system is provided that includes at least one electricity generating element, a fuel supplier, and an oxidant supplier. The electricity generating element includes the above described membrane-electrode assembly of the second embodiment and separators arranged at either side thereof. The electricity generating element generates electricity through oxidation of a fuel and reduction of an oxidant. The fuel supplier supplies the electricity generating element with the fuel. The oxidant supplier supplies the electricity generating element with the oxidant.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
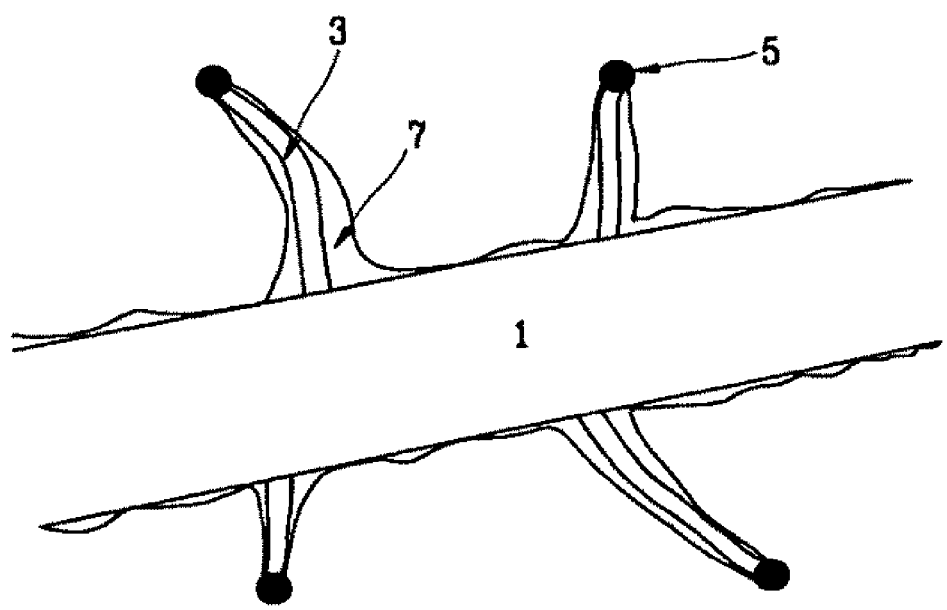
FIG. 1 schematically shows a supporter adapted to be an electrode and including a nano-carbon fiber, a nano-carbon grown from the nano-carbon fiber, and a catalyst disposed on the nano-carbon.

In the following detailed description, certain embodiments of the present invention are shown and described, by way of illustration. As those skilled in the art would recognize, the described embodiments may be modified in various ways, all without departing from the spirit or scope of the present invention. Accordingly, the drawings and description are to be regarded as illustrative in nature, rather than restrictive.

According to an embodiment of the present invention, an electrode includes a supporter including a nano-carbon fiber, a nano-carbon grown from the nano-carbon fiber, and a catalyst disposed on the nano-carbon in order to increase catalyst activity.

The catalyst can assist in growing a nano-carbon and causing oxidation and reduction in a fuel cell and may include, for example, Pt, Ru, Fe, Pd, Ni, Rh, and/or Co. The catalyst in the electrode for the fuel cell is not supported on a carrier but disposed on the nano-carbon. A conventional catalyst can accomplish appropriate cell activity only when supported on a carrier and is relatively expensive to produce. In addition, the catalyst has a high resistance against the carrier, which decreases catalyst activity. By contrast, since the catalyst of the embodiment of the present invention has a small resistance against the nano-carbon, it can actually increase catalyst activity.

In addition, since the catalyst is located at a terminal end of the nano-carbon, it can avoid catalyst aggregation and thereby increase its surface area, resulting in even higher catalyst activity.

According to an embodiment of the present invention, the nano-carbon fiber has a diameter ranging from 10 nm to 1000 nm, and, in one embodiment, has a diameter ranging from 10 nm to 300 nm, and, in one embodiment, has a diameter ranging from 10 nm to 200 nm. If the diameter is less than 10 nm, it is impossible to produce and difficult to grow. Whereas, if the diameter is more than 1000 nm, the loading amount of the catalyst is reduced, thereby decreasing activity.

In one embodiment, the nano-carbon is a nanotube having a tube shape which has advantages such as good dispersion of catalyst, increased fuel supply and catalyst usability. The nano-carbon (or nanotube) has a diameter ranging from 0.1 to 100 nm and, in one embodiment, has a diameter ranging from 1 to 50 nm. If the diameter is less than 0.1 nm, it is impossible to produce and difficult to grow. Whereas, if the diameter is more than 100 nm, the loading amount of the catalyst is reduced, thereby decreasing activity.

In addition, the nano-carbon fiber is connected with the nano-carbon through a proton conductive binder, which can facilitate the movement of protons and thereby further increase catalyst activity. The proton conductive binder may be any suitable binder used in forming a catalyst layer such as polyperfluorosulfonic acid, poly[2,2'-(m-phenylene)-5,5'-bibenzimidazole], poly(2,5-benzimidazole), polybenzoxazole, polybenzthiazole, and combinations thereof.

A second active catalyst may be disposed on the surface of the nano-carbon resulting in an increase of catalyst efficiency. The second active catalyst may include platinum, ruthenium, osmium, platinum-ruthenium alloys, platinum-osmium alloys, platinum-palladium alloys, platinum-M alloys, or combinations thereof, where M is a transition element material selected from the group consisting of Ga, Ti, V, Cr, Mn, Fe, Co, Ni, Cu, Zn, Sn, Mo, W, Rh, and combinations thereof.

The active catalyst may be coated on the surface of the nano-carbon using a deposition process or a slurry coating process. The deposition process may be a process selected from the group consisting of a sputtering process, a thermal or electron beam evaporation process, a chemical vapor deposition process, a physical vapor deposition process, a laser ablation process, and combinations thereof. The slurry coating process may be performed as follows: a slurry is prepared by adding catalysts to solvents and then the slurry is coated. The solvent may be water, glycerol, or alcohol, such as methanol or isopropanol.

Since the nano-carbon is formed on the surface of the nano-carbon fiber as aforementioned, the electrode for the fuel cell of an embodiment of the present invention can have high ion conductivity and large surface area. In addition, the electrode can have small-sized pores and thereby can reduce cross-over of a hydrocarbon fuel. Accordingly, an embodiment of the present invention can reduce or prevent a power output deterioration of the fuel cell when fuel crosses over from an anode to a cathode and is oxidized there.

FIG. 1 shows a structure of an electrode for a fuel cell in accordance with an embodiment of the present invention. The structure of the electrode includes a proton conductive binder 7 and has a carbon nanotube 3 grown on a nano-carbon fiber 1. That is, as shown in FIG. 1, the carbon nanotube 3 is grown on the nano-carbon fiber 1, and a catalyst 5 is disposed at a terminal end of the carbon nanotube 3. In addition, the nano-carbon fiber 1 is firmly connected with the carbon nanotube 3 by the proton conductive binder 7.

In forming an electrode as, e.g., shown in FIG. 1, a polymer solution is prepared by mixing a polymer, a catalyst compound, and a solvent.

The polymer and the catalyst compound are mixed in a weight ratio of 7:3 to 9:1. Such a weight ratio of the polymer and the catalyst compound renders a preferred amount of the catalyst supported in the carrier. The polymer solution has a concentration ranging from 10 to 30 wt %. A lower concentration of the polymer solution less than 10 wt % causes a nano-carbon bead rather than a nano-carbon fiber to be prepared during the electrospinning process, and so it is difficult to obtain a suitable nano-carbon fiber. A higher concentration more than 30% increases the size of the fiber. The polymer may include polyacrylonitrile which exhibits good strength and stiffness, and has a low expansion coefficient.

As for the mixing process, the polymer is mixed with the catalyst compound, and thereafter, the solvent can be added to the mixture, or the polymer is mixed with the solvent and thereafter the catalyst compound can be added thereto. That is, the present invention is not limited by the mixing order.

The catalyst compound should be a compound including a catalyst that can assist in growing a nano-carbon, can cause oxidation and reduction of a fuel cell, and can also be easily decomposed during heat treatment, thereby leaving the catalyst on the nano-carbon fiber. The catalyst includes, for example, Pt, Ru, Fe, Pd, Ni, Rh, and/or Co, and has a nanoparticle size, preferably less than 100 nm. In addition, the catalyst compound may include any compound that can be dissolved into a solvent or has an electric charge in the solvent, for example, acetate, acetylacetonate, a halide (e.g., chloride), or a nitride.

As for the polymer solution, a polymer nano fiber is prepared by an electrospinning process. Exemplifying the electrospinning process in more detail, the polymer solution is applied with an electric field ranging from 5 to 25 kV. A charged droplet hanging at the end of a capillary tube reaches an equilibrium at the point when the electric force becomes the same as the surface tension of the polymer solution. When the electric force (or potential) increases higher than the surface tension, the charged droplet becomes unstable, forming a charged jet. When the jet is dispersed in a direction toward a collection substrate, the solvent is evaporated from the polymer solution to thereby form (or grow) the polymer nano fiber.

The polymer nano fiber is stabilized and carbonized to prepare a nano-carbon fiber. The stabilization is performed by increasing a temperature up to 500° C. at 5° C./min under an inert gas atmosphere after annealing the polymer nano fiber at a temperature ranging from 240 to 250° C. The carbonization is performed by increasing a temperature up to 1100° C. at 5° C./min under an inactive atmosphere after treating (or standing) the polymer nano fiber at a temperature ranging from 500 to 550° C. for 4 hours under an inactive atmosphere. The inactive atmosphere may include argon gas, nitrogen gas, etc. Next, a nano-carbon was grown by applying (or blowing) a carbon material (e.g., a carbon gas) into the nano-carbon fiber. The carbon material may include hexane, acetylene, methane, butane, etc.

Accordingly, the nano-carbon is grown on the nano-carbon fiber to thereby prepare (or form) the electrode for a fuel cell.

Also, in one embodiment, the electrode is deposited with a second active catalyst used as a catalyst in a fuel cell so that the second active catalyst can remain on the surface of the nano-carbon to thereby further increase a catalyst activity.

The deposition process may be a physical vapor deposition process, a chemical vapor deposition process, a sputtering process, an enhanced chemical vapor deposition process, a thermal chemical vapor deposition process, an electron beam evaporation process, a vacuum thermal evaporation process, a laser ablation process, a thermal evaporation process, etc.

The second active catalyst may include platinum, ruthenium, osmium, platinum-ruthenium alloys, platinum-osmium alloys, platinum-palladium alloys, platinum-M alloys, or combinations thereof, where M is a transition element material selected from the group consisting of Ga, Ti, V, Cr, Mn, Fe, Co, Ni, Cu, Zn, Sn, Mo, W, Rh, and combinations thereof.

A membrane-electrode assembly includes an electrode having a structure as mentioned above. That is, the membrane-electrode assembly includes an anode, a cathode, and a polymer electrolyte membrane. At least one of the anode or the cathode is the above electrode. The polymer electrolyte membrane includes a polymer with high proton conductivity so that protons produced at a catalyst layer of the anode are transferred to a catalyst layer of the cathode. The polymer electrolyte membrane may include a polymer resin having a cation exchange group at its side chain. The cation exchange group is selected from the group consisting of a sulfonic acid group, a carboxylic acid group, a phosphoric acid group, a phosphonic acid group, and derivatives thereof.

Non-limiting examples of the polymer include at least one proton conductive polymer selected from the group consisting of a perfluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer. In a preferred embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly (2,5-benzimidazole). In one embodiment, the polymer membrane has a thickness ranging from 10 to 200 µm.

Figure 2:
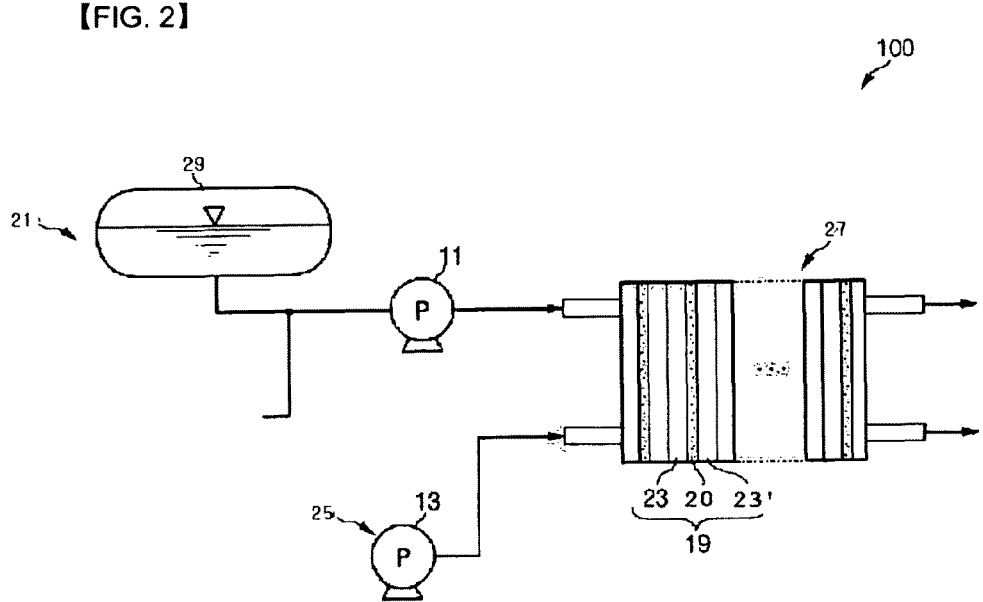
FIG. 2 schematically shows a structure of a fuel cell system according to an embodiment of the present invention.
Figure 3:
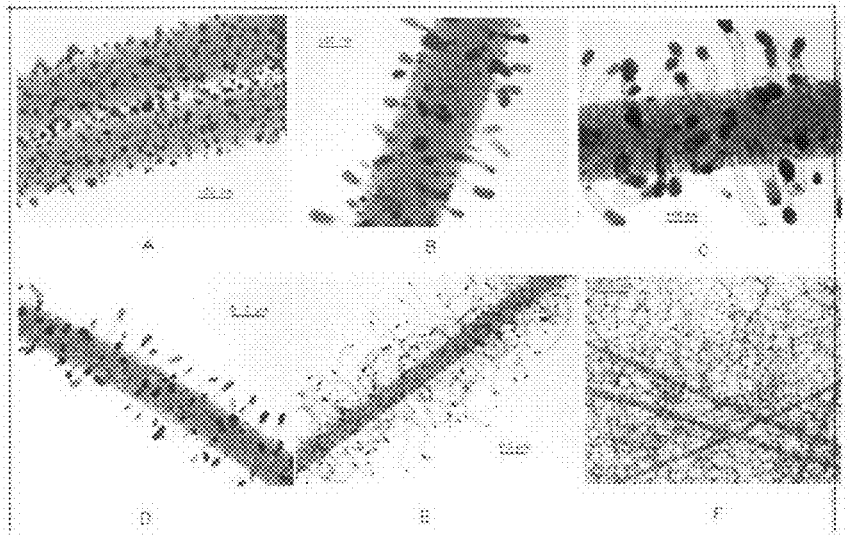
FIGS. 3A, 3B, 3C, 3D, 3E, and 3F are SEM photographs that show growing processes of the structure shown in FIG. 1.

FIG. 2 shows a schematic structure of a fuel cell system 100 including a membrane-electrode assembly as described above. In more detail, FIG. 2 illustrates a type of fuel cell system in which a fuel and an oxidant are provided to an electricity generating element through pumps, but the present invention is not limited to such a structure. A fuel cell system of the present invention may alternatively include a structure in which a fuel and an oxidant are provided in a diffusion manner.

As shown in FIG. 2, the fuel cell system 100 includes at least one electricity generating element (or one or more electricity generating elements) 19 that generates electrical energy through an electrochemical reaction of a fuel and an oxidant, a fuel supplier 21 for supplying the fuel to the electricity generating element 19, and an oxidant supplier 25 for supplying the oxidant to the electricity generating element 19.

The electricity generating element 19 is incorporated in a stack 27. In addition, the fuel supplier 21 is equipped with a tank 29 that stores the fuel, and a pump 11 that is connected therewith. The fuel pump 11 supplies the fuel stored in the tank 29 with a pumping power, which may be predetermined.

The oxidant supplier 25, which supplies the electricity generating element 19 of the stack 27 with the oxidant, is equipped with at least one pump 13 for supplying the oxidant with a pumping power, which may be predetermined.

The electricity generating element 19 includes a membrane-electrode assembly 20 that oxidizes the fuel and reduces the oxidant, and separators 23 and 23' that are respectively positioned at opposite sides of the membrane-electrode assembly to supply the fuel and the oxidant.

The following examples illustrate the present invention in more detail. However, it is understood that the present invention is not limited by these examples.

EXAMPLE 1

To prepare a polymer solution, Polyacrylonitrile and iron acetate $(Fe(Acc)_3)$ were mixed in a weight ratio of 7:3, and thereafter the mixture was added to dimethylformamide up to a concentration of 15 wt % and dissolved therein.

The polymer solution was applied with an electric field of 10 kV to form a polyacrylonitrile solution jet. The jet was discharged to prepare a supporter including a polyacrylonitrile nano fiber. The supporter including a polyacrylonitrile nano fiber was annealed in air at 250° C. in a hot furnace and then heated up to 500° C. at 5° C./min under an argon atmosphere to stabilize it.

Next, the supporter including a polyacrylonitrile nano fiber was treated at 500° C. under a $H_2$ and argon atmosphere for 4 hours to transfer $Fe^{3+}$ into Fe, and thereafter the nano fiber was carbonized at a temperature up to 1100° C. at 5° C./min under an Ar atmosphere to form the supporter including the nano-carbon fiber.

The obtained nano-carbon fiber was cooled down to 700° C. and thereafter a carbon nanotube was grown on the surface of the nano-carbon fiber by sending hexane into an Ar flow.

In accordance with an embodiment, FIGS. 3A to 3F show how at least one carbon nanotube (or one or more carbon nanotubes) grew on the surface of a nano-carbon fiber as time elapsed at 30 seconds (3A), 2 minutes (3B), 3 minutes (3C: magnification of 100 nm), 3 minutes (3D: magnification of 0.2 µm), 5 minutes (3E), and 20 minutes (3F). As shown in FIGS. 3A to 3F, when the carbon nanotube was formed on the surface of the nano-carbon fiber, pores therein become smaller in size. As such, an electrode was prepared in which the carbon nanotube was grown on the nano-carbon fiber and a catalyst Fe was positioned at the terminal end of the carbon nanotube. Here, the nano-carbon fiber has a diameter of 100 nm, and the carbon nanotube has a diameter of 10 nm.

The electrode was used as an anode and/or a cathode, and a perfluorosulfonic acid polymer electrolyte membrane (the trade name NAFION 112) was disposed between the anode and the cathode to form a membrane-electrode assembly.

EXAMPLE 2

An electrode, in which a carbon nanotube was grown on a nano-carbon fiber and a catalyst Pt was positioned at a terminal end of the carbon nanotube, was prepared by using platinum acetate $(Pt(Acc)_3)$ instead of iron acetate $(Fe(Acc)_3)$ in substantially the same method as Example 1. Then, a membrane-electrode assembly was prepared using the electrode. Here, the nano-carbon fiber has a diameter of 100 nm, and the carbon nanotube has a diameter of 10 nm.

EXAMPLE 3

An electrode, in which a carbon nanotube was grown on a nano-carbon fiber and a catalyst Pt was positioned at the terminal end of the carbon nanotube, was prepared by using ruthenium acetate (Ru(Acc)$_3$) instead of iron acetate (Fe(Acc)$_3$) in substantially the same method as Example 1. Then, a membrane-electrode assembly was prepared using the electrode. Here, the nano-carbon fiber has a diameter of 100 nm, and the carbon nanotube has a diameter of 10 nm.

EXAMPLE 4

An electrode was prepared by substantially the same method as Example 1 except that the mixing ratio of polyacrylonitrile and iron acetate was 9:1. Then, a membrane-electrode assembly was prepared using the electrode.

EXAMPLE 5

An electrode was prepared by substantially the same method as Example 1 except that the mixing ratio of polyacrylonitrile and iron acetate was 8:2. Then, a membrane-electrode assembly was prepared using the electrode.

COMPARATIVE EXAMPLE 1

3 g of Pt supported in carbon (the amount of platinum supported on carbon was 20 wt %) and 1 g of NAFION 112 were dispersed into 50 g of isopropyl alcohol and thereafter, spray-coated on both sides of NAFION 112 to prepare a membrane-electrode assembly having a catalyst layer, that is, to prepare a cathode and an anode.

REFERENCE EXAMPLE 1

Figure 4:
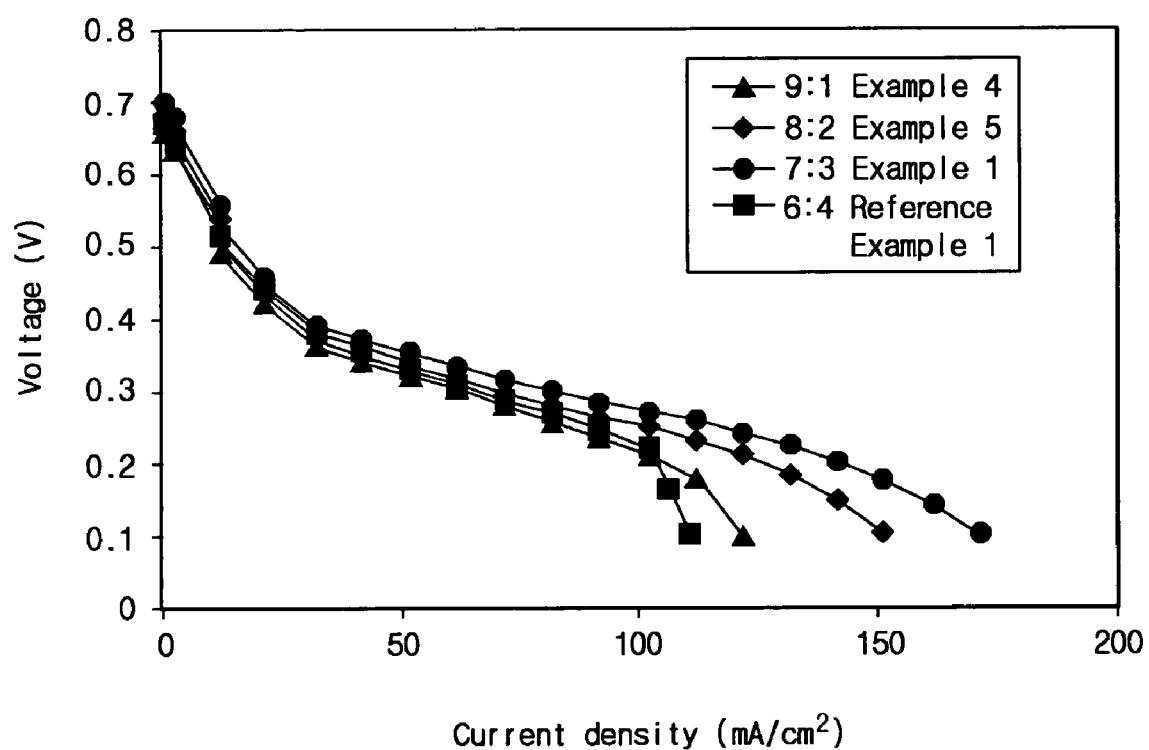
FIG. 4 is a graph showing current densities of the fuel cells according to Examples 1, 4, and 5 of the present invention and Reference Example 1.

An electrode was prepared by substantially the same method as Example 1 except that the mixing ratio of polyacrylonitrile and iron acetate was 6:4. Then, a membrane-electrode assembly was prepared using the electrode. The current densities of fuel cells using the membrane-electrode assemblies according to Examples 1, 4, and 5, and Reference Example 1 were measured. The results are shown in FIG. 4 As shown in FIG. 4, Examples 1, 4, and 5 in which the mixing ratio of the polymer and the catalyst compound is within 7:3 to 9:1 exhibited higher current density than that according to Reference Example 1. In particular, the cell according to Example 1 with the mixing ratio of 7:3 exhibited the highest current density.

In view of the foregoing, an electrode for a fuel cell of an embodiment of the present invention has high catalyst activity, high ion conductivity, and large surface area because a nano-carbon is grown on a nano-carbon fiber. In addition, the electrode has small-sized pores, thereby decreasing crossover of a hydrocarbon fuel.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. An electrode for a fuel cell comprising:,
a supporter comprising a nano-carbon fiber;
a nano-carbon formed on the surface of the nano-carbon fiber; and
a catalyst on the nano-carbon,
wherein a proton conductive binder supports a firm connection between the nano-carbon fiber and the nano-carbon.

2. The electrode of claim 1, wherein the proton conductive binder comprises a material selected from the group consisting of polyperfluorosulfonic acid, poly[2,2'-(m-phenylene)-5,5'-bibenzimidazole], poly(2,5-benzimidazole), polybenzoxazole, polybenzthiazole, and combinations thereof.

3. The electrode of claim 1, wherein the catalyst comprises a material selected from the group consisting of Pt, Ru, Fe, Pd, Ni, Rh, Co, and combinations thereof.

4. The electrode of claim 1, wherein a second active catalyst is on a surface of the nano-carbon.

5. The electrode of claim 4, wherein the second active catalyst comprises a material selected from the group consisting of platinum, ruthenium, osmium, a platinum-ruthenium alloy, a platinum-osmium alloy, a platinum-palladium alloy, a platinum-M alloy, and combinations thereof, and wherein M comprises a transition element material selected from the group consisting of Ga, Ti, V, Cr, Mn, Fe, Co, Ni, Cu, Zn, Sn, Mo, W, Rh, and combinations thereof.

6. The electrode of claim 1, wherein the catalyst is at a terminal end of the nano-carbon.

7. A membrane-electrode assembly comprising:
an anode;
a cathode; and
a polymer electrolyte membrane between the anode and the cathode,
wherein at least one of the anode or the cathode comprises:
a supporter comprising a nano-carbon fiber;
a nano-carbon formed on the surface of the nano-carbon fiber; and
a catalyst on the nano-carbon,
wherein a proton conductive binder supports a firm connection between the nano-carbon fiber and the nano-carbon.

8. The membrane-electrode assembly of claim 7, wherein the proton conductive binder comprises a material selected from the group consisting of polyperfluorosulfonic acid, poly[2,2'-(m-phenylene)-5,5'-bibenzimidazole], poly(2,5-benzimidazole), polybenzoxazole, polybenzthiazole, and combinations thereof.

9. The membrane-electrode assembly of claim 7, wherein the catalyst comprises a material selected from the group consisting of Pt, Ru, Fe, Pd, Ni, Rh, Co, and combinations thereof.

10. The membrane-electrode assembly of claim 7, wherein another catalyst is on a surface of the nano-carbon.

11. The membrane-electrode assembly of claim 10, wherein the another catalyst comprises a material selected from the group consisting of platinum, ruthenium, osmium, a platinum-ruthenium alloy, a platinum-osmium alloy, a platinum-palladium alloy, a platinum-M alloy, and combinations thereof, and wherein M comprises a transition element material selected from the group consisting of Ga, Ti, V, Cr, Mn, Fe, Co, Ni, Cu, Zn, Sn, Mo, W, Rh, and combinations thereof.

12. The membrane-electrode assembly of claim 7, wherein each of the anode and the cathode comprises:
the supporter comprising the nano-carbon fiber;
the nano-carbon formed on the surface of the nano-carbon fiber; and
the catalyst on the nano-carbon.

13. A fuel cell system comprising:
an electricity generating element adapted to generate electricity through oxidation of a fuel and reduction of an oxidant, and comprising:
a membrane-electrode assembly comprising:
an anode;
a cathode; and
a polymer electrolyte membrane between the anode and the cathode, wherein at least one of the anode or the cathode comprises:
- a supporter comprising a nano-carbon fiber,
- a nano-carbon formed on the surface of the nano-carbon fiber; and
- a catalyst on the nano-carbon; and a separator at either side of the membrane-electrode assembly;

a fuel supplier adapted to supply a fuel to the electricity generating element; and an oxidant supplier adapted to supply an oxidant to the electricity generating element, wherein a proton conductive binder supports a firm connection between the nano-carbon fiber and the nano-carbon.

14. The fuel cell system of claim 13, wherein the proton conductive binder comprises a material selected from the group consisting of polyperfluorosulfonic acid, poly[2,2'-(m-phenylene)-5,5'-bibenzimidazole], poly(2,5-benzimidazole), polybenzoxazole, polybenzthiazole, and combinations thereof.

15. The fuel cell system of claim 13, wherein the catalyst comprises a material selected from the group consisting of Pt, Ru, Fe, Pd, Ni, Rh, Co, and combinations thereof.

16. The fuel cell system of claim 13, wherein another catalyst is on a surface of the nano-carbon.

17. The fuel cell system of claim 16, wherein the another catalyst comprises a material selected from the group consisting of platinum, ruthenium, osmium, a platinum-ruthenium alloy, a platinum-osmium alloy, a platinum-palladium alloy, a platinum-M alloy, and combinations thereof, and wherein M comprises a transition element material selected from the group consisting of Ga, Ti, V, Cr, Mn, Fe, Co, Ni, Cu, Zn, Sn, Mo, W, Rh, and combinations thereof.

* * * * *